United States Patent [19]

Thompson

[11] Patent Number: 5,050,491
[45] Date of Patent: Sep. 24, 1991

[54] STEAM ELIMINATOR FOR FRANKFURTER PEELER

[76] Inventor: James H. Thompson, Rte. 3, Box 397-AA Emerald Rd., Greenwood, S.C. 29646

[21] Appl. No.: 514,133

[22] Filed: Apr. 25, 1990

[51] Int. Cl.$^5$ ............................................. A22C 11/00
[52] U.S. Cl. ....................................... 99/483; 99/472; 99/516; 452/30; 452/32
[58] Field of Search ................... 99/441, 450, 472-474, 99/476, 477, 483, 516, 584, 588, 593; 17/1 F, 49, 34

[56] References Cited

U.S. PATENT DOCUMENTS

| | | | |
|---|---|---|---|
| 1,403,045 | 1/1922 | McHugh | 99/441 |
| 2,374,425 | 4/1945 | De Weerth | 99/473 |
| 2,682,827 | 7/1954 | Greesly | 99/473 |
| 2,737,374 | 3/1956 | Terrett | 99/483 |
| 3,312,995 | 4/1967 | Garey | 17/1 F |
| 3,512,471 | 5/1970 | Sargeant | 99/472 |
| 4,118,828 | 10/1978 | Melanson | 17/1 F |
| 4,222,150 | 9/1980 | Anderson | 17/49 |
| 4,414,707 | 11/1983 | Koken | 17/1 F |
| 4,437,206 | 3/1984 | Becker | 17/1 F |
| 4,905,587 | 3/1990 | Smithers | 99/516 |

Primary Examiner—Timothy F. Simone
Attorney, Agent, or Firm—Bailey & Hardaway

[57] ABSTRACT

A combustion chamber for eliminating used steam and condensate from a frankfurter peeler is provided having a jacket utilizing a source of vacuum for receiving exhaust steam and condensate from an extension of a perforate frankfurter conditioning chamber and for discharging said exhaust steam and moisture having been used for conditioning a frankfurter for removal of its cellulosic casing prior to packaging.

3 Claims, 2 Drawing Sheets

STEAM ELIMINATOR FOR FRANKFURTER PEELER

BACKGROUND OF THE INVENTION

In the manufacture of frankfurters the constituents are placed in a cellulosic plastic skin where processing results in the formation of frankfurters. After processing, it is necessary to peel the plastic skin away from the frankfurter prior to packaging. Conventional peelers may be utilized such as a Ranger Apollo Peeler supplied by Ranger Tool Co., Inc., 5786 Ferguson Rd., Bartlett, Tenn. 38134.

During the peeling process, steam is applied to the frankfurter contained within the plastic skin in order to condition the frankfurter for peeling. This conditioning takes place in what is known as a combustion chamber which includes an elongated perforate conditioning chamber surrounded by an enlarged imperforate chamber created to provide a manifold for receiving skin and delivering same into the conditioning chamber for pretreatment of the frankfurter.

During operating, the used steam is exhausted directly into the room which becomes steam and moisture laden so as to create a climate which is inhospitable to workers but which also promotes the growth of bacteria and other deleterious agents.

While the invention is described as being utilized in connection with the frankfurter peelers, the combustion chamber of the present invention may be utilized in other food processing equipment presenting problems in relation to exhaust steam and moisture.

Accordingly, it is an important object of the invention to eliminate exhaust steam and moisture in a food processing operation through the use of an improved combustion chamber.

Another important object of the invention is the provision of a jacket for collecting exhaust steam and moisture through the use of perforate extensions and the application of suction for removing the exhaust steam and moisture from the jacket and delivering same to a removable system which may include a fan located in the outside atmosphere.

SUMMARY OF THE INVENTION

It has been found that a combustion chamber for eliminating exhaust steam and moisture from a food processor such as a frankfurter peeler may utilize a jacket for receiving exhaust steam and condensed moisture from perforate extensions of the perforate conditioning chamber and supply an exhaust system to said jacket for removing the exhaust steam and moisture thus clarifying the air in the room or in the environment wherein the food processing is taking place.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate a combination chamber for conditioning frankfurters prior to peeling in order to remove the plastic skin prior to packaging. An elongated perforate conditioning chamber is illustrated at A. An enlarged imperforate chamber surrounds the perforate conditioning chamber defining a manifold B for receiving steam and delivering same into the perforate conditioning chamber for conditioning the frankfurters. A source of steam C is connected to the manifold. A jacket D surrounds the enlarged imperforate chamber defining an eliminator chamber for receiving exhaust steam and condensate from the perforate conditioning chamber. An extension E of the perforate conditioning chamber communicates with the eliminator chamber for delivering exhaust steam and condensate thereto. A source of suction F is connected to the eliminator chamber for drawing the exhaust steam and condensate into the eliminator and removing same therefrom.

Figure 1:
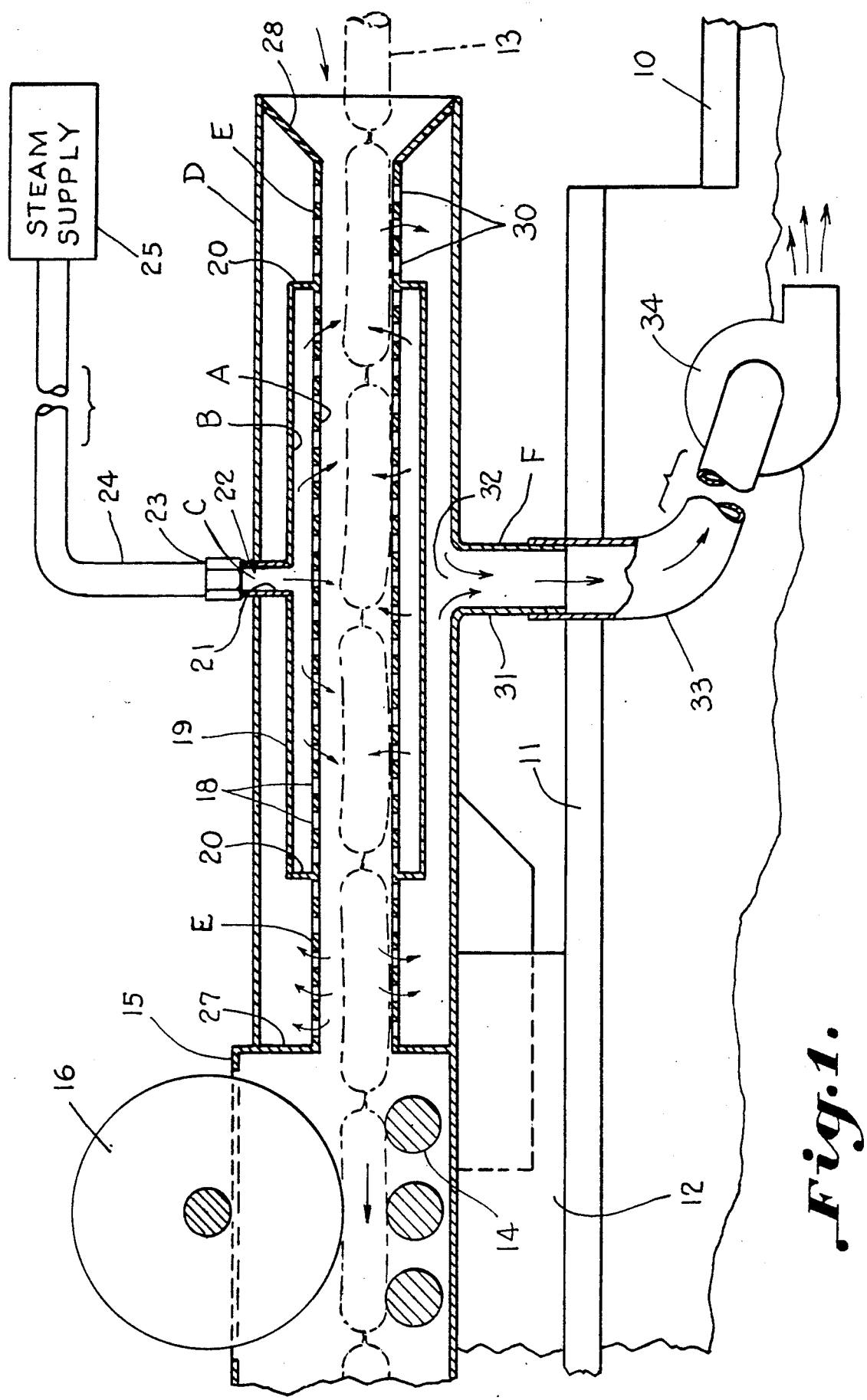
FIG. 1 is a sectional side elevation illustrating a combustion chamber utilized upon a frankfurter peeler constructed in accordance with the present invention.
Figure 2:
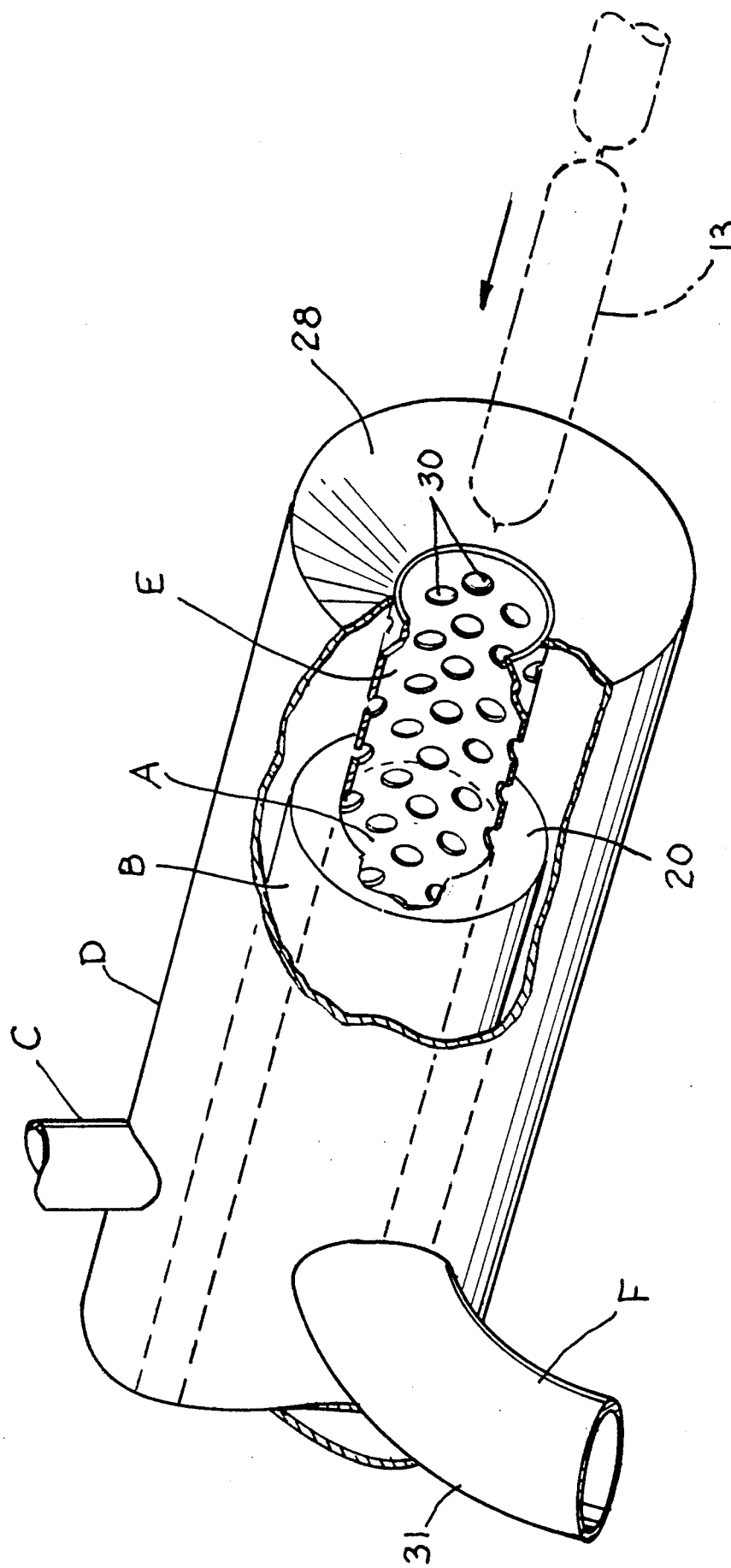
FIG. 2 is a perspective view with parts broken away further illustrating a combustion chamber constructed in accordance with the invention including the jacket and a source of suction for the exhaust system.

Referring more particularly to FIG. 1, a frankfurter peeler includes a table 10 which extends forwardly from a frame member 11 upon which is positioned a holder 12 for a combustion chamber.

It will be noted that frankfurters 13 are illustrated as being fed into the combustion chamber from the table 10 and outwardly thereof as by driven delivery rolls 14 into a compartment 15 where the cellulosic skin is peeled away in part by the application of a knife 16 of the slitter section.

The combustion chamber is mounted upon a suitable bracket 17 within the holder 12. An elongated perforate conditioning chamber illustrated at A includes an open ended tubular member having spaced openings 18 therein for driving steam to the internal bore thereof through which the frankfurters 14 are fed. An enlarged imperforate chamber surrounds the perforate conditioning chamber defining a manifold B which is provided by an imperforate sleeve 19 having end closures 20 and an opening 21 for receiving a source of steam C which includes a tubular fitting 22 and a nut 23. The nut 23 has connection with a line 24 leading to a steam supply schematically illustrated at 25.

A jacket D surrounds the enlarged imperforate chamber B for receiving exhaust steam and condensate. The jacket D has end closures 27 for creating the elimination chamber on one end. Closure members 28 are provided on the other end connecting the jacket with the open end of the elongated perforate conditioning chamber A providing an outwardly flared opening to accommodate entry of the frankfurters into the elongated perforate conditioning chamber which is open on both ends as illustrated.

Extension E of the perforate conditioning chamber is illustrated as being carried at each end of the perforate conditioning chamber A and includes enlarged spaced openings 30. The total cross sectional area of the spaced openings 30 should exceed the total cross sectional area of the openings 18 in order to provide the most effective operation. The extension E on one end is carried between the end closure members 20 and 27 and on the other end between the opposite end closure member 20 and at flared closure member 28. The source of suction F is provided in the form of a nipple 31 communicating through an opening 32 in the jacket D. Exhaust steam and condensate from the perforate conditioning chamber is received as a result of suction introduced from the nipple 31 from the line 33 which has a blower fan 34 which may be located externally of the processing room in the open air atmosphere.

It will thus be noted that an improved combustion chamber has been provided for a frankfurter peeler and the like which is capable of clarifying the surrounding air both to the advantage of the workers and the reduction of disease bearing organisms. The utilization of the extensions E which include the enlarged openings 30 permit the collection of the exhaust steam within a jacket which then permits removal through a suction system to the outside atmosphere.

While a preferred embodiment of the invention has been described using specific terms, such description is for illustrative purposes only, and it is to be understood that changes and variations may be made without departing from the spirit or scope of the following claims.

What is claimed is:

1. A combustion chamber for a frankfurter peeler comprising:
   an elongated perforate conditioning chamber;
   an enlarged imperforate chamber surrounding said perforate conditioning chamber defining a manifold therebetween for receiving steam and delivering same into said perforate conditioning chamber for conditioning frankfurters passed therethrough prior to peeling;
   a source of steam connected to said manifold;
   a jacket surrounding said enlarged imperforate chamber defining an eliminator chamber for receiving exhaust steam and condensate from said perforate conditioning chamber;
   an extension of said perforate conditioning chamber communicating with said eliminator chamber for delivering said exhaust steam and condensate thereto;
   an end closure member at remote ends of said perforate conditioning chamber and said elimination chamber forming a substantially imperforate suction chamber whereby evacuation of said exhaust steam from said elimination chamber is enhanced; and
   a source of suction connected to said eliminator chamber for drawing said exhaust steam and condensate into said eliminator and removing same therefrom.

2. The structure set forth in claim 1 wherein said extension of said perforate conditioning chamber extends on each opposite end thereof and communicates with said eliminator chamber on each said opposite end to deliver said exhaust steam and condensate thereto through a plurality of spaced openings in said extension of said perforate conditioning chamber.

3. The structure set forth in claim wherein said perforate conditioning chamber contains spaced openings for receiving steam into said perforate conditioning chamber, and wherein said spaced openings in said extension exceed in area said spaced openings for receiving steam.

* * * * *